(No Model.)
J. G. HOHENSTEIN.
ADJUSTABLE FASTENING FOR TOOL HANDLES.
No. 435,647. Patented Sept. 2, 1890.
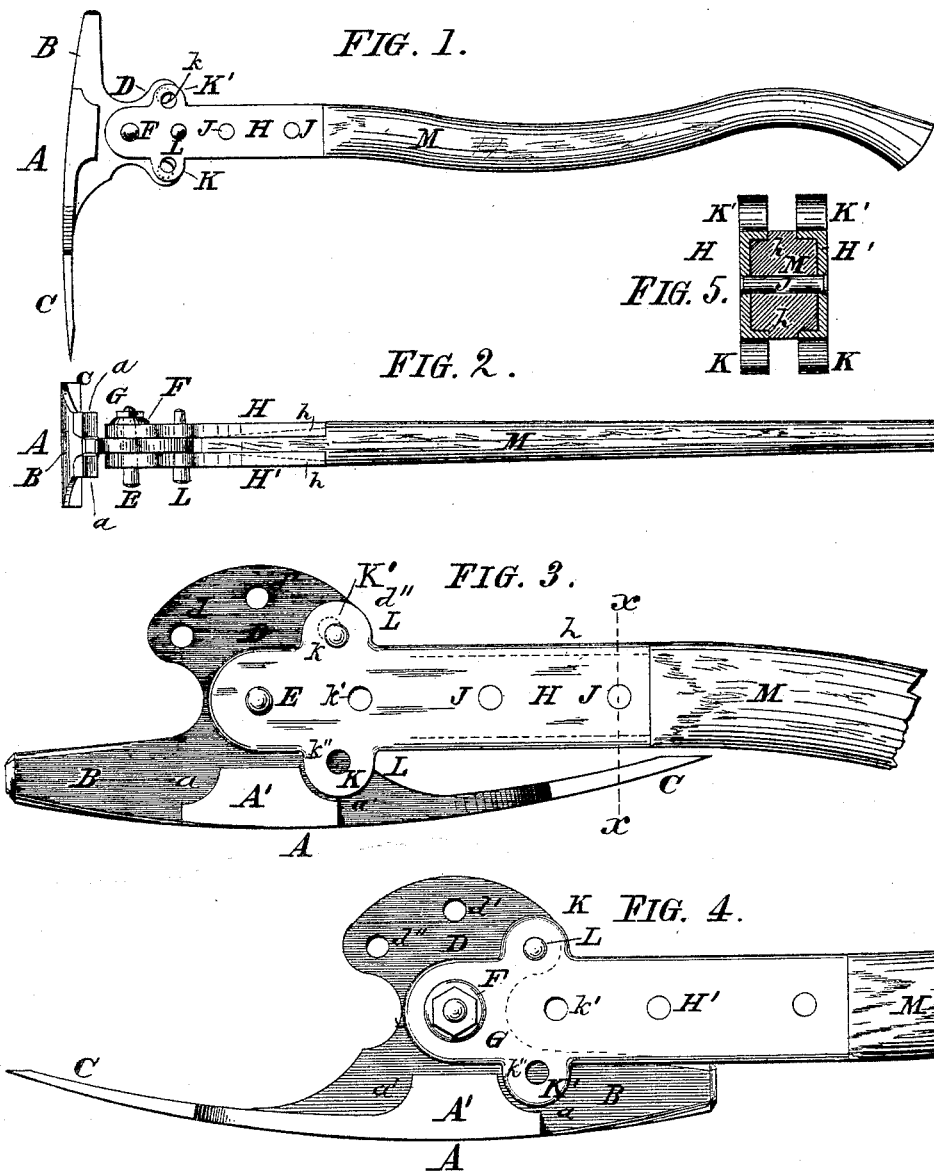
Witnesses:
F. C. Olin
Centie S. Stark
Inventor:
John George Hohenstein,
by Michael J. & Wm. O. Stark
Attorneys.

UNITED STATES PATENT OFFICE.

JOHN GEORGE HOHENSTEIN, OF GOWANDA, NEW YORK.

ADJUSTABLE FASTENING FOR TOOL-HANDLES.

SPECIFICATION forming part of Letters Patent No. 435,647, dated September 2, 1890.

Application filed April 17, 1890. Serial No. 348,366. (No model.)

*To all whom it may concern:*

Be it known that I, JOHN GEORGE HOHENSTEIN, of Gowanda, in the county of Cattaraugus and State of New York, have invented certain new and useful Improvements in Adjustable Fastenings for Tool-Handles; and I do hereby declare that the following description of my said invention, taken in connection with the accompanying sheet of drawings, forms a full, clear, and exact specification, which will enable others skilled in the art to which it appertains to make and use the same.

This invention has general reference to an improved adjustable fastening for tool-handles; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a front elevation of my improved device. Fig. 2 is a plan of the same. Figs. 3 and 4 are front elevations on a larger scale, showing different positions of adjustment. Fig. 5 is a transverse sectional elevation in line $x\ x$ of Fig. 3.

Like parts are designated by corresponding letters of reference in all the figures.

The object of this invention is the production of an adjustable fastening for adzes and similar wood-working tools to their handles. This is accomplished by the following construction: A represents an adz or other similar wood-working implement having a body A′, provided with curved notches $a\ a'$ on both its sides, and centrally a web D, formed into a segment of a circle and having in its center an aperture for the passage of a pivot E, as hereinafter to be referred to. Concentrically around this central aperture there are arranged a series of apertures $d\ d'\ d''$ for the passage of a pin L.

The adz A has on one end the cutting-edge C and on the other opposite end a hammer-head B, as clearly shown in the drawings, though in place of said hammer-head there may be provided other tools, or the head dispensed with without changing the nature of my invention.

M is the handle. It has on its forward end two metallic cheeks H H′, secured thereto by means of rivets J or other analogous fastening. These cheeks are formed on their free ends into the shape of a trefoil by providing them with semicircular lateral projections K K′. In these cheeks there are four apertures, one in the forward portion receiving the pivot E already mentioned, one in the center of each lateral projection, and the last one centrally between those in the lateral projections, these apertures being concentrically arranged around the aperture for the pivot E the same distance as the apertures $d\ d'\ d''$ in the web D; but the spaces between the respective apertures $d\ d'\ d''$ and the apertures $k\ k'\ k''$ are differentially arranged, so that when one of the holes in the web will register with one of the apertures in the cheeks H H′ all the others will deviate. By thus differentially arranging these apertures I am enabled to secure the adz A in nine different positions relative to the handle M, the central position being shown in Figs. 1 and 2 and the two extreme positions being illustrated in Figs. 3 and 4. To change from one to the other position the pin L is withdrawn and inserted into that set of holes in the series $k$ and $d$ which will match when the adz is in the required position, (or nearest thereto,) and to enable this being readily accomplished these holes are tapered and the pin L constructed accordingly, so that a slight tap upon the smallest end of the pin L will loosen it, while a contrary act will tighten it and thereby securely hold the parts in position.

The pivot E is a tapering pin having a screw-thread on its smaller end and a washer G and nut F placed thereon, so that by tightening said nut any slack in the pivotal connection may be readily taken up.

The cheeks H H′ have ledges $h$, as shown in Figs. 3 and 5, forming shoulders, so that they will be securely fastened to the handle M and thereby make the attachment of the adz to said handle a very firm and secure one. These cheeks H H′ may be readily produced in malleable metal (either iron or steel) and the adz also produced in the same manner, tool-steel of suitable quality being welded to the portion C in a manner now well understood in the arts.

It will now be readily observed that by pivoting the adz to the cheeks of the handle and making the same adjustable by the differential attachment I am enabled to place the said adz into a number of different positions to adapt it to different requirements and thereby largely increasing its usefulness, so that it may be readily used as a so-called "slick" or "chisel," as shown in Fig. 4, while when not in use the adz may be turned into the position shown in Fig. 3, when the cutting-edge C will be in a position in which it is not easily injured by coming in contact with other tools or when placed in a carpenter's tool-chest, where it will occupy much less space than those heretofore in use.

Having thus fully described my invention, I claim as new and desire to secure by Letters Patent of the United States—

1. In an adz and similar tool, a fastening consisting of the web having a pivot and a series of fastening-apertures, the cheeks having also a pivotal and a series of fastening apertures, as described, said fastening-apertures in the cheeks being differently arranged from those in the web, as and for the object set forth.

2. In a tool-fastening, a device for differentially securing the tool to its handle, said device consisting of a web having a pivotal and fastening apertures, as described, on said tool, and two cheeks having each a pivotal and fastening apertures secured to the handle, said fastening-apertures in the web being differently spaced from those in the cheeks but equidistant from the pivotal aperture, whereby a large number of changes may be made with a less number of fastening-apertures, as set forth.

3. In a wood-working tool, substantially as described, the combination, with the body $A'$, having the segmental web D, provided centrally with a pivot and a series of concentrically-arranged apertures $d\ d'\ d''$, of the handle M, having cheeks H H', provided with the lateral projections K K' and the apertures $k\ k'\ k''$, and the hole E and the fastening-pin L, the said apertures $d\ d'\ d''$ and $k\ k'\ k''$ being differentially arranged, as stated.

In testimony that I claim the foregoing as my invention I have hereto set my hand in the presence of two subscribing witnesses.

JOHN GEORGE HOHENSTEIN.

Attest:
  MICHAEL J. STARK,
  WM. O. STARK.